(12) United States Patent
Howlader et al.

(10) Patent No.: US 10,177,853 B2
(45) Date of Patent: Jan. 8, 2019

(54) BINOMIAL PULSE-POSITION MODULATION (BPPM) USING SPARSE RECOVERY FOR FREE-SPACE OPTICAL FADING/TURBULENT CHANNELS

(71) Applicant: Raytheon Company, Waltham, MA (US)

(72) Inventors: Mostofa Howlader, Tucson, AZ (US); Anthony Reid, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/378,780

(22) Filed: Dec. 14, 2016

(65) Prior Publication Data

US 2018/0167144 A1 Jun. 14, 2018

(51) Int. Cl.
*H04B 10/112* (2013.01)
*H04B 10/524* (2013.01)
*H04B 10/11* (2013.01)

(52) U.S. Cl.
CPC .......... *H04B 10/524* (2013.01); *H04B 10/11* (2013.01)

(58) Field of Classification Search
CPC ........................................ H04B 10/11–10/116
See application file for complete search history.

(56) References Cited

U.S. PATENT DOCUMENTS

2009/0191814 A1* 7/2009 Blu .................. G06F 17/10
455/63.1
2011/0293286 A1* 12/2011 Colwell ............... H04B 10/116
398/140
2014/0341589 A1* 11/2014 Schmid ................ H04B 10/116
398/131

OTHER PUBLICATIONS

P. L. Dragotti, M. Vetterli and T. Blu, "Sampling Moments and Reconstructing Signals of Finite Rate of Innovation: Shannon Meets Strang-Fix," IEEE Transactions on Signal Processing, vol. 55, No. 5, pp. 1741-1757, May 2007; doi: 10.1109/TSP.2006.890907; URL: http://ieeexplore.ieee.org/stamp/stamp.jsp?tp=&arnumber=4156380&isnumber=4156357.*

Simon et al., "Performance Analysis and Tradeoffs for Dual-Pulse PPM on Optical Communication Channels With Direct Detection"; IEEE Transactions on Communications; vol. 52, No. 11; Nov. 2004; pp. 1969-1979 (11 pages).

(Continued)

*Primary Examiner* — Nathan M Cors
(74) *Attorney, Agent, or Firm* — Daly, Crowley, Mofford & Durkee, LLP

(57) ABSTRACT

Concepts, systems and methods are provided herein for generating encoded binomial pulse position modulation (BPPM) signals having random, sparse sets of multiple pulses per channel usage interval for use in Free-Space Optical (FSO) communications. A data symbol can be modulated into a set of BPPM pulses for transmission over a FSO channel and a signal can be generated having the set of BPPM pulses over a predetermined time interval. The BPPM pulses can be encoded into one or more codewords based on a number of error correction bits to form a coded signal using the one or more codewords to represent the signal having the set of pulses for transmission over the free-space optical channel. The coded signal can be filtered and sampled to generate a set of samples. Position and amplitude data for the samples can be determined to reconstruct and decode the coded signal.

16 Claims, 9 Drawing Sheets

(56) References Cited

OTHER PUBLICATIONS

Vetterli et al.; "Sampling Signals With Finite Rate of Innovation"; IEEE Transactions on Signal Processing; vol. 50, No. 6; Jun. 2002; pp. 1417-1428 (12 pages).
Tur et al., "Innovation Rate Sampling of Pulse Streams With Application to Ultrasound Imaging", IEEE Transactions on Signal Processing; vol. 59, No. 4; Apr. 2011; pp. 1827-1842 (16 pages).
Ivan B. Djordjevic; "Multidimensional Pulse-Positon Coded-Modulation for Deep-Space Optical Communication"; IEEE Photonics Technology Letters; vol. 23, No. 18; Sep. 15, 2011; pp. 1355-1357 (3 pages).
Candès et al.; "Robust Uncertainty Principles: Exact Signal Reconstruction From Highly Incomplete Frequency Information"; IEEE Transactions on Information Theory, vol. 52, No. 2; Feb. 2006; pp. 489-509 (21 pages).

\* cited by examiner

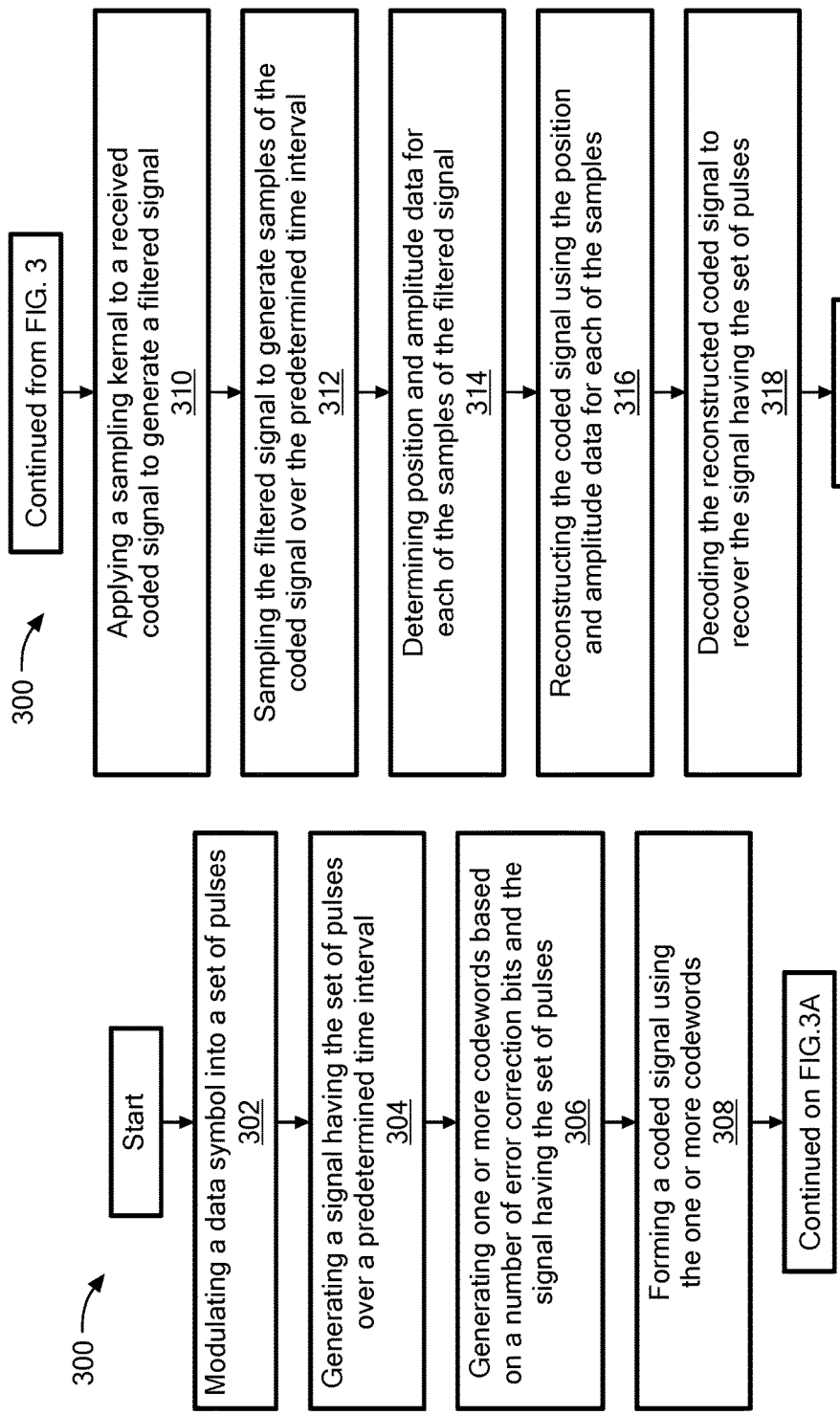

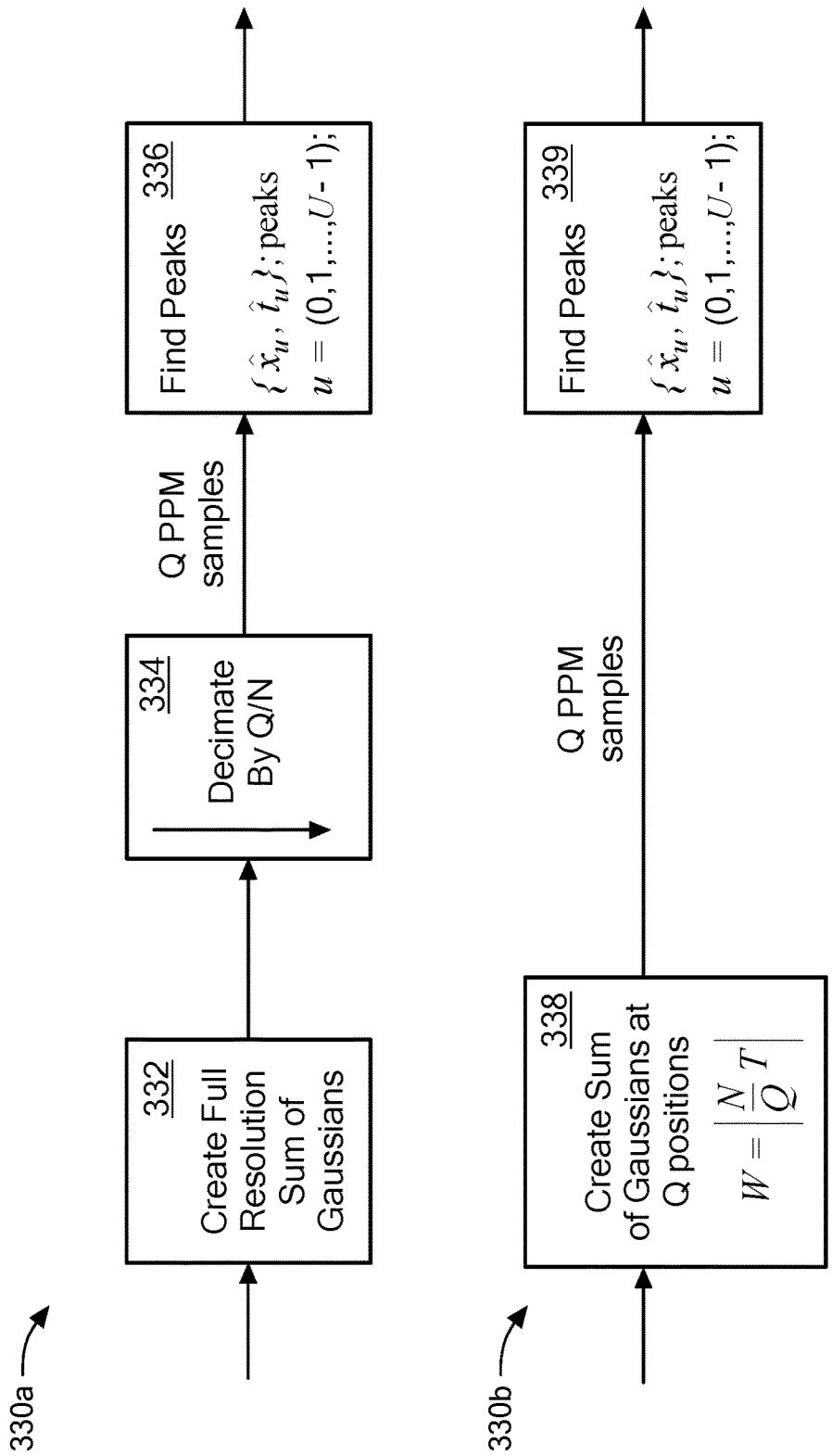

BINOMIAL PULSE-POSITION MODULATION (BPPM) USING SPARSE RECOVERY FOR FREE-SPACE OPTICAL FADING/TURBULENT CHANNELS

BACKGROUND

As is known in the art, Pulse-Position Modulation (PPM) can use one pulse per channel use to represent a symbol (e.g., a set of bits) located at different time epochs during a time interval (e.g., M-ary PPM). The number of pulses per channel usage can be defined by the time interval divided by a pulse width. To increase quantization for PPM requires narrower pulses per channel usage. Alternative schemes used for ultra-wideband (UWB) such as differential PPM (DPPM) or combinatorial PPM (CPPM) can improve spectral efficiency and capacity with decoding-rate/complexity still dictated by channel bandwidth driver by the PPM pulse width. Furthermore, for schemes such as (CPPM) there is no inherent coding gain against fading/turbulence.

SUMMARY

Concepts, systems and methods are provided herein for generating encoded binomial pulse position modulation (BPPM) signals having random, sparse sets of multiple pulses per channel usage interval for use in Free-Space Optical (FSO) communications. Channel usage as used herein refers to an amount of bandwidth that a signal needs for transmission over a respective channel. For example, in some embodiments, the bandwidth can be one-half the number of dimensions of signal space required per second. Using BPPM pulses, a capacity of the BPPM signal (i.e., symbol quantization) can be increased based at least upon a combination of the random selection of pulses and symbols. The BPPM pulses can be combined with various encoding techniques (e.g., Reed-Solomon (R-S)) to provide for coding gain against fading and/or turbulence typically experienced in FSO communications by exploiting a sparseness of the encoded BPPM signal. For example, using non-radix 2 Galois field (GF(P)), a sparse set of BPPM codeword symbols can be generated having a small number of pulses relative to a total number of possible pulse positions available per channel usage interval. The sparse set of BPPM codeword symbols can be transmitted over an FSO channel at a fixed-rate or finite rate of innovations (FRI) for each channel usage interval. The FRI can be proportional to a length of the coded BPPM signal. In some embodiments, the total number of message symbols possible corresponds to the number of encoded BPPM symbols (K) (i.e., $P^K$).

Using FRI, a demodulator of a receiver may perform sparse reconstruction of the transmitted coded BPPM signal to recover the sparse BPPM symbols at a reduced sampling rate as compared with conventional methods. In an embodiment, the sampling rate may be reduced because the decoding sampling rate corresponds to the number of BPPM symbols per channel usage interval and not the width of each PPM symbol as in conventional methods. In some embodiments, compressive sensing may be performed to recover the sparse BPPM symbols to exploit the sparse number of pulses per channel usage interval.

The sparse reconstruction may include using a low pass filter to generate samples for recovery at a lower sampling rate than conventional methods. For example, the signal to noise ratio (SNR) for detection may be determined by a noise bandwidth of the low pass filter which can be a fraction of the receiver bandwidth for the pulses.

An OAM transceiver system may be provided for generating the encoded BPPM signals having random, sparse sets of multiple pulses per channel usage interval. The OAM transceiver system can be configured for free-space optical communication (FSO). In an embodiment, FSO communication refers to an optical communication technology that uses light propagating in free space to wirelessly transmit data. In some embodiments, the data may be transmitted in the form of a light beam or laser beam over a FSO channel that generally comprises free-space (e.g., air, outer space, vacuum, etc.). The OAM transceiver system may be configured to perform orbital angular momentum (OAM) multiplexing to multiplex signals onto electromagnetic waves using the orbital angular momentum of the electromagnetic waves to distinguish between the different orthogonal signals.

In a first aspect, a method for generating a coded signal is provided. The method comprises encoding a data symbol into a set of pulses for transmission over a free-space optical channel, the data symbol corresponding to one or more bits, generating a signal having the set of pulses over a predetermined time interval, generating one or more codewords based on a number of error correction bits and the signal having the set of pulses and forming a coded signal using the one or more codewords to represent the signal having the set of pulses for transmission over the free-space optical channel.

In some embodiments, the data symbol includes a binomial data symbol comprising the one or more bits. The set of pulses may include binomial pulse position modulation (BPPM) pulses. The set of pulses may be randomly generated. In some embodiments, the set of pulses can be sparsely generated with respect to a duration of the predetermined time interval.

The predetermined number of error correction bits can be determined based on a number of data bits in the signal and an error correction threshold.

A sampling kernel can be applied to the coded signal to generate a filtered signal and sampling the filtered signal to generate samples of the filtered signal. Position data and amplitude data can be determined for each of the samples of the filtered signal. The coded signal can be reconstructed using the position and amplitude data for each of the samples. The coded signal can be decoded at a sample rate equal to a number of pulses per predetermined time interval of the coded signal.

In another aspect, a method for reconstructing a signal is provided. The method comprises applying a sampling kernel to a coded signal received from a free-space optical channel to generate a filtered signal, sampling the filtered signal to generate samples of the filtered signal over a predetermined time interval, determining position and amplitude data for each of the samples of the filtered signal over the predetermined time interval, reconstructing the coded signal using the position and amplitude data for each of the samples and decoding the reconstructed coded signal to generate a signal having a set of pulses over a channel usage interval.

The sampling kernel can have a bandwidth corresponding to a rate of innovation of the coded signal. A set of Diracs corresponding to the coded signal can be generated based on one or more derivatives of an equation representing the samples of the coded signal. The position data and the amplitude data can be determined for each Dirac in the set of Diracs. The coded signal can be reconstructed using the position data and the amplitude data for each Dirac corresponding to the samples in the predetermined time interval.

The coded signal can be decoded at a sampling rate at least equal to twice the number of pulses per channel usage interval of the coded signal.

In another aspect, a system for generating and reconstructing a coded signal for free-space communications is provided. The system comprising a binomial pulse position modulation circuit configured to convert a data symbol into a set of pulses, the data symbol corresponding to one or more bits, and generate a signal having the set of pulses over a channel usage interval. The system further comprises an encoding circuit configured to encode the signal by generating one or more codewords based on a predetermined number of error correction bits. The one or more codewords can be used represent the signal having the set of pulses.

The system further comprises a filtering circuit configured to receive the coded signal, apply a sampling kernel to the received coded signal to generate a filtered signal, and sample the filtered signal to generate a set of samples of the filtered signal over a predetermined time interval. The system further comprises a decoding circuit configured to decode the samples of the filtered signal to recover the signal having the set of pulses over the channel usage interval.

In some embodiments, the system comprises a reconstruction module configured to determine position and amplitude data for each of the samples of the filtered signal. The reconstruction module can be configured to reconstruct the coded signal using the position and amplitude data for each of the samples. The decoder circuit can be configured to sample the coded signal at a rate equal to at least twice the number of pulses per the channel usage interval of the coded signal.

BRIEF DESCRIPTION OF THE DRAWINGS

The foregoing concepts and features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the concepts, systems and techniques described herein. Like numbers in the figures denote like elements.

FIGS. 3-3A are a flow diagram of a method for generating and reconstructing a coded signal over a FSO channel;

FIG. 3C is a block diagram of a method for performing down sampling;

DETAILED DESCRIPTION

Figure 1:
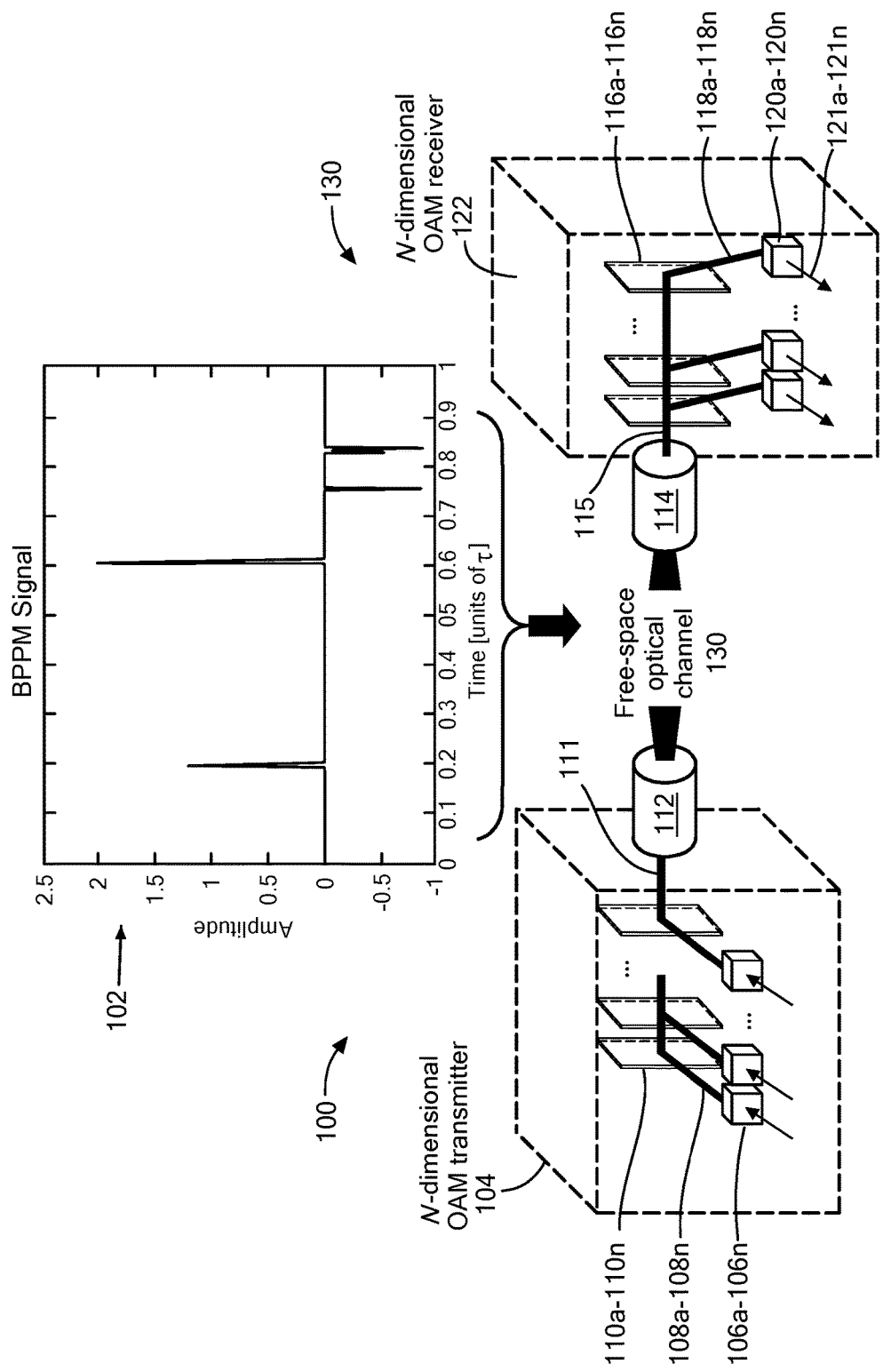
FIG. 1 is block diagram of an orbital angular momentum transceiver system for use in free-space optical (FSO) communications.

Now referring to FIG. 1, an orbital angular momentum (OAM) transceiver system 100 includes a transmitter 104 and a receiver 122. Transmitter 104 and receiver 122 can be configured to communicate over a free-space orbital (FSO) channel 130. For example, transmitter 104 can transmit an encoded binomial pulse position modulation (BPPM) signal 102 over FSO channel 130 to receiver 122. It should be appreciated that although transceiver system 100 is described herein as an OAM transceiver system, transceiver system 100 can be configured and utilized in a variety of different types of FSO communications.

Transmitter 104 includes one or more modulators 106a-106n, one or more holograms 110a-110n and a first optics device 112 to form an N-dimensional OAM transmitter. Receiver 122 includes a second optical device 114, one or more holograms 116a-116n and one or more demodulators 120a-120n to form an N-dimensional OAM receiver.

The FSO channel may 130 may include different forms of free-space, such as but not limited to air, outer space or a vacuum environment. As the signals are transmitted over the free-space, the signals may be affected by the environmental properties of the respective FSO channel 130. For example, conditions such as fog, rain or snow can cause fading, resulting in a deviation of the attenuation of the signal when it is received at receiver 122. Further, signals transmitted over FSO channel 130 may be affected by turbulence. Thus, to mitigate these issues typically experienced with FSO communications, transmitter 104 can be configured to generate and transmit encoded BPPM signal 102 that provides for coding gain against fading and/or turbulence issues of FSO channel 130.

Transmitter 104 can be configured to use OAM techniques to manipulate phase spatial distribution of a light beam to encode data information into the light beam. Thus, in some embodiments, encoded BPPM signal 102 may include an OAM beam or optical beam.

The one or more modulators 106a-106n of transmitter 104 may include modulator circuits and/or electronic devices formed within transmitter 104. For example, the one or more modulators 106a-106n may include, but not limited to, a radiofrequency (RF) modulator or a Mach-Zehnder modulator. Modulators 106a-106n can be configured to control an amplitude of an optical wave (e.g., optical signal) to generate one or more modulated signals 108a-108n. Modulators 106a-106n can receive a baseband input signal and generate a modulated signal as a preliminary step to prepare the signal for transmission. Each of the one or more modulated signals 108a-108n may correspond to different OAM modes. In other embodiments, the one or more modulated signals 108a-108n may correspond to the same OAM mode. The OAM mode may refer to a property (e.g., shape) of the modulated signals 108a-108n (e.g., property of a light beam). In some embodiments, modulators 106a-106n inject or otherwise add information onto a carrier wave of the modulated signals 108a-108n. An output of modulators 106a-106n can be communicatively coupled to an input of holograms 110a-110n.

The one or more holograms 110a-110n may receive one or more modulated signals 108a-108n from the one or more modulators 106a-106n. Holograms 110a-110n can be configured to diffract light or otherwise adjust diffraction angles of the modulated signals 108-108n to form an image or optical signal. For example, holograms 110a-110n can generate a holographic signal 111 that is transmitted to optics device 112, which can be provided as a telescope. Holograms 110a-110n may include volume holograms, thick holograms, Bragg holograms. reflective surfaces or other forms of physical structures used for adjusting diffraction angles of a light beam or optical signal. An output of holograms 110a-110n can be communicatively coupled to an input of optics device 112.

First optics device 112 may receive holographic signal 111 from holograms 110a-110n. First optics device 112 can be configured to increase a diameter (or size) of the holographic signal 111 to generate encoded BPPM signal 102 for transmission over the FSO channel 130. For example, first optics device 112 may include a telescope, such as an expanding telescope. The encoded BPPM signal 102 may be a coded signal in the form of an OAM beam. For example, in some embodiments, encoded BPPM signal 102 may include a set of BPPM pulses used to represent a data symbol. The encoded BPPM signal 102 may be encoded using various block encoding techniques to encode the BPPM pulses as will be discussed in greater detail with respect to method 300 of FIGS. 3-3A.

An input of second optics device 114 can receive encoded BPPM signal 102 from an output of first optics device 112. Second optics device 114 can be configured to modify properties of encoded BPPM signal 102 to generate a compressed signal 115. For example, second optics device 114 can be configured to reduce a diameter or size of encoded BPPM signal 102 to generate compressed signal 115. An output of second optics device 114 can be communicatively coupled to an input of one or more holograms 116a-116n.

Receive holograms 116a-116n can receive compressed signal 115 from second optics device 114. Holograms 116a-116n can be configured to diffract light or otherwise adjust diffraction angles of the compressed signal 115 to generate one or more projection signals 118a-118n. For example, holograms 116a-116n can be configured to determine projections along corresponding OAM modes and provide the respective OAM mode to one or more of the demodulators 120a-120n. Thus, in an embodiment, each of the one or more projection signals 118a-118n may correspond to a different OAM mode. In some embodiments, each of the one or more projection signals 118a-118n may correspond to the same OAM mode. Holograms 116a-116n may include conjugate volume holograms, thick holograms, Bragg holograms. reflective surfaces or other forms of physical structures used for adjusting diffraction angles of a light beam or optical signal. An output of holograms 116a-116n may be communicatively coupled to an input of one or more demodulators 120a-120n.

Demodulators 120a-120n can receive the one or more projections 118a-118n from holograms 116a-116n. Demodulators 120a-120n may include modulator circuits and/or electronic devices formed within receiver 122. For example, demodulators 120a-120n may include, but not limited to, coherent demodulators or direct detection receivers.

Demodulators 120a-120n can be configured to demodulate projection signals 118a-118n to separate or otherwise identify carrier phase information from the projection signals 120a-120n. For example, demodulators 120a-120n can separate information and/or data that was modulated onto the carrier of the projection signals 120a-120n to generate signals 121a-121n.

In some embodiments, one or more collimators (not shown) may be disposed in the signal path (e.g., FSO channel 130) between transmitter 104 and receiver 122. The collimators may be components of transmitter 104 and/or receiver 122 or separate devices disposed in the signal path between transmitter 104 and receiver 122.

Figure 2:
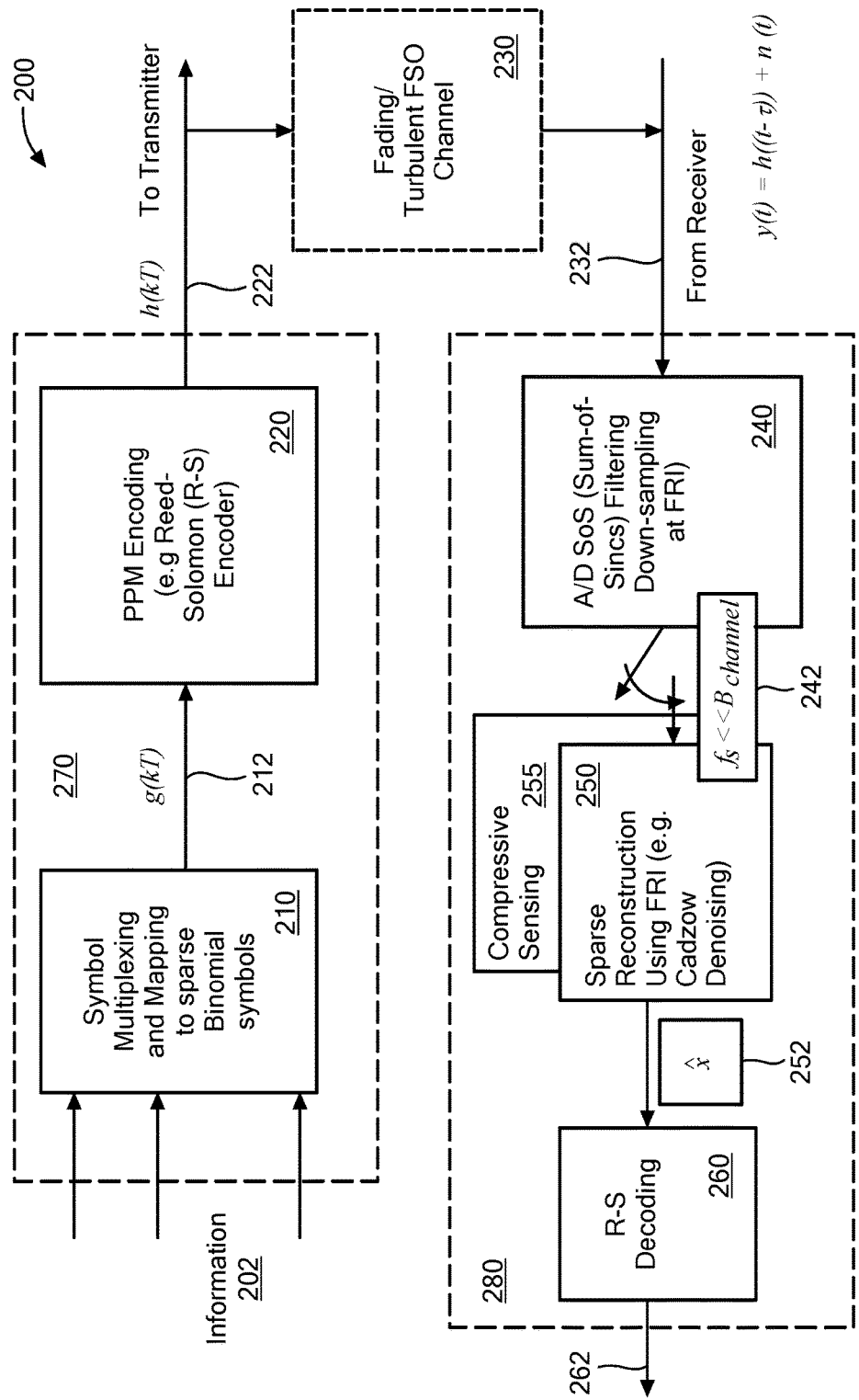
FIG. 2 is a block diagram of a system for encoding and decoding a binomial pulse position modulation (BPPM) signal for FSO communications.

Now referring to FIG. 2, an OAM transceiver system 200 for encoding and decoding a binomial pulse position modulation (BPPM) signal over a FSO channel is provided. The OAM transceiver system 200 includes BPPM circuit 210, an encoding circuit 220, a filtering circuit 240, a reconstruction circuit 250 and a decoding circuit 260. The reconstruction circuit 250 may include a compressive sensing circuit 255.

In some embodiments, the BPPM circuit 210 and an encoding circuit 220 form a transmitter portion 270 of OAM transceiver system 200 and filtering circuit 240, reconstruction circuit 250 and decoding circuit 260 form a receiver portion 280 of OAM transceiver system 200.

In operation, a signal 202 can be received at BPPM circuit 210. The signal 202 (e.g., optical signal, laser beam) may include one or more bits corresponding to information to be transmitted. BPPM circuit 210 can convert the one or more bits into a data symbol. In some embodiments, the one or more bits may be converted into a single data symbol.

BPPM circuit 210 modulates the one or more bits into a set of data symbols that correspond message symbols of the Galois field of a Reed-Solomon code. For example, one data symbol can be formed using 4 bits corresponding a GF ($2^4$=16) Reed-Solomon code where each message symbol is formed over the 4-bits. These 4-bit messages (e.g., BPPM signal 212) are converted to PPM symbols in encoding circuit 220 after being encoded by a Reed-Solomon code. For example, BPPM circuit 210 can generate data symbols for a radix-2 GF ($2^m$) Reed-Solomon encoder, where m is the number of bits to construct a Reed-Solomon codeword, a BPPM signal 212 (g(kT)). In some embodiments, bits can be converted into symbols for a non-radix-2 GF ($p^m$) Reed-Solomon code, where (p) is a prime number. For such embodiments, (p) and (m) can be selected to provide a minimum degree of sparsity (e.g. 10%) when these symbols are converted into PPM pulses by encoding circuit 220.

Encoding circuit 220 can encode the BPPM signal 212 by generating one or more codewords. Encoding circuit 220 can use a variety of different block encoding techniques to generate the codewords. For example, in some embodiments, encoding circuit 220 can use Reed-Solomon encoding techniques to generate the codewords.

Codewords are generated by adding data symbols to the BPPM signal 212. For example, the BPPM signal 212 may have K data symbols of s bits each and 2t symbol error correction capability. A Reed-Solomon encoder transforms the (K) message symbols to generate an (n) symbol codewords, where (n=K+2t). In an embodiment, the n symbol codeword can be corrected for up to t symbols that contain errors or incur errors during transmission, where each symbol has (s) bits. Thus, each codeword symbol can be converted into a PPM symbol. Each binary codeword set of bits can be mapped to one time location. For example, the binary pattern (1010) is converted to decimal number 10 which is position 10 out of 16 possible positions in time. The encoding techniques will be described in greater detail below with respect to method 300 of FIGS. 3-3A.

Encoder circuit can generate an encoded signal 222, h(kT) and transmit the encoded signal 222 over a FSO channel 230 to filtering circuit 240. During transmission over the FSO channel 230, the encoded signal 222 may experience various effects of an atmosphere or environment that FSO channel 230 is provided in, such as atmospheric absorption, weather complications (e.g., rain, snow, fog, etc.) resulting in fading and/or turbulence.

Thus, the encoded signal received at filtering circuit 240 can be processed, resulting in a signal having time delays and/or low bit error rates. For example, filter circuit 240 may receive a modified encoded signal, $y(t)=h((t-\tau))+n(t)$, where n(t) represents a noise factor of FSO channel 230. In an embodiment, by using BPPM pulses and encoding the BPPM signals with error correction bits the effects of the FSO channel 230 can be mitigated. In some embodiments, by using BPPM pulses and encoding the BPPM signals with error correction bits the effects of the FSO channel 230 can be eliminated.

Receive filtering circuit 240 can receive the modified encoded signal 232 and apply a sampling kernel to the modified encoded signal 232 to generate a filtered signal 242. Filtering circuit may be configured to sample signals using finite rate of innovation (FRI) and/or compressive sensing techniques. To prepare the modified coded signal for FRI sampling, the sampling kernel may be applied to the modified encoded signal 232. The sampling kernel may include sinc and/or Gaussian kernels. Filtering circuit 240 may include a lowpass filter approximation filter (e.g., sinc filter) to generate a lowpass approximation of the modified coded signal. In some embodiments, the sampling kernel may be referred to as a convolution kernel or smoothing filter.

Filtering circuit 240 can sample the filtered signal 242 a predetermined number of times to generate a predetermined number of samples. The set of samples may be equal to or greater than a minimum number of samples to reconstruct the original coded signal. For example, the number of samples needed to accurately reconstruct the coded signal may correspond to a number of degrees of freedom of the respective signal. The sampling will be described in greater detail below with respect to method 300 of FIGS. 3-3A. Filtering circuit 240 can provide the set of samples of the filtered signal 242 to reconstruction circuit 250.

Reconstruction circuit 250 can reconstruct the coded signal using the samples of the filtered signal 242. In some embodiments, reconstruction circuit 250 can reconstruct the signal using FRI techniques (e.g., Cadzow denoising) or compressive sensing. For example, reconstruction circuit 250 may take one or more derivatives (e.g., (R+1) derivatives) of the samples of filtered signal 242 until the signal is converted into a set of K-Diracs x(t). In other embodiments, for example embodiments using modulated PPM symbols to represent the signals of interest, derivatives may not be needed and thus not taken.

Reconstruction circuit 250 can be configured to determine Fourier series coefficients corresponding to the samples of filtered signal 242. The Fourier series coefficients can be manipulated using various techniques (e.g., annihilating filter) to determine position and amplitude data corresponding to each of the K Diracs and thus for each of the samples.

In some the embodiments, the position and amplitude data may correspond to a Dirac representative of a respective sample. The position data may provide a location of a respective sample along an x-axis of a graph of the set of samples and the amplitude data may provide a height of a respective sample along a y-axis of the set of samples. Thus, having the position and amplitude data for each of the samples, the coded signal can be reconstructed to generate a reconstructed coded signal 252. The reconstruction will be described in greater detail below with respect to method 300 of FIGS. 3-3A. Reconstruction circuit 250 can be coupled to an input of decoding circuit 260 to provide the samples of filtered signal 242 and the position and amplitude data.

Decoding circuit 260 can be configured to decode the filtered signal 242 to recover the original signal having the set of pulses. In some embodiments, decoding circuit 260 can sample the set of samples of the coded signal at a rate equal to a number of pulses per channel usage interval of the coded signal. In an embodiment, decoding circuit 260 generates an output signal 262 that is the BPPM signal 212 (e.g., set of pulses) generated by the BPPM circuit of the transmitter.

Now referring to FIGS. 3-3A, a method 300 for generating and reconstructing a coded signal is provided. The encoding and decoding techniques, as described herein, can be performed to generate and encode a binomial pulse position modulation (PPM) signal for use in FSO communications. For example, an encoded BPPM signal can be generated by an OAM transceiver system (e.g., OAM transceiver system 100 of FIG. 1, OAM transceiver system 200 of FIG. 2). The encoded BPPM signal can be transmitted over a FSO channel to a receiver portion of the OAM transceiver for sampling and reconstruction. The encoded BPPM signal includes random, sparse sets of multiple BPPM pulses per channel usage interval. The random, sparse sets of multiple pulses can increase the capacity of the encoded BPPM signal and the encoding techniques provide coding gain to mitigate atmospheric and/or environmental affects of the FSO channel. For example, the BPPM signal can be generated such that the affects of fading and/or turbulence typically experienced in FSO communications is reduced or eliminated. The BPPM signal can be reconstructed and decoded at a rate equal to a number of BPPM pulses.

Method 300 begins at block 302, by encoding a data symbol into a set of pulses. The data symbol may correspond to or otherwise include one or more bits. For example, a data stream having one or more bits may be received at one or more modulators of a transmitter portion of a OAM transceiver (e.g., modulators 106a-106n, transmitter 104 of OAM transceiver system 100 of FIG. 1) for transmission over the FSO channel. The one or more bits may be encoded into or otherwise mapped to a data symbol. In some embodiments, the one or more bits may be encoded into multiple data symbols.

The data symbol can be modulated into a set of pulses. For example, the data symbol (and thus the one or more bits) can be encoded into a set of pulses to generate BPPM pulses. In some embodiments, one symbol may be encoded into multiples BPPM pulses.

At block 304, a signal can be generated having the set of pulses over a predetermined time interval. In some embodiments, the predetermined time interval corresponds to a channel usage interval. The set of pulses can be randomly generated over the channel usage interval. For example, each pulse in the set of pulses can be generated such that a respective pulse doesn't have a predetermined position or a have a position selected based on a position of another different pulse in the set of pulses. The set of pulses may include sparse sets of multiple pulses per the channel usage interval. The sparseness of a set of pulses may be measured with respect to a duration of the respective predetermined time interval (e.g., channel usage interval). For example, the sparseness may be measured based at least upon a number or a percentage of pulses generated as compared to a total duration of the respective channel usage interval and a total number of possible pulse positions within the channel usage interval. In some embodiments, the signal may include a BPPM signal having multiple pulses used to represent one data symbol over the channel usage interval.

At block 306, one or more codewords may be generated based on a number of error correction bits and the signal having the set of pulses (e.g., BPPM signal). A codeword may generally refer to one or more portions of the signal that have been divided or otherwise apportioned into coded blocks of data of some fixed size. The fixed size may be based at least in part on the size of the original signal and the number of error correction bits added to the original signal.

To encode the BPPM signal, the set of pulses may be converted into one or more codewords for transmission over the FSO channel. Encoding the BPPM signal can mitigate against various affects of the FSO channel environment (e.g., atmospheric conditions, fading, turbulence, etc.) by adding error correction bits to the BPPM signal to create a buffer for a predetermined number of potential errors that may occur during transmission and can be corrected when the BPPM signal is received at a receiver portion (e.g., receiver 122 of FIG. 1) of the FSO communication path.

In some embodiments, the codewords may be generated using block-based error correcting code techniques, such as but not limited to, Reed-Solomon (R-S) encoding techniques. For example, the set of pulses may be mapped to one or more codewords using a non-radix-2 R-S code. In block encoding, a decoder can process each block of a codeword to correct errors caused during transmission to recover the original data. To convert the set of message symbols into a codeword or multiple codewords, a number of error correction symbols may be added before converting codeword symbols into the set of PPM pulses. The number of error correction bits added can correspond to a number of errors that can be corrected at a demodulator or decoding circuit of a receiver portion of an OAM transceiver system (e.g., demodulators 120a-120n of FIG. 1, decoding circuit 260 of FIG. 2) when the codewords are received. Thus, the number of error correction symbols added may be selected based at least in part on an error correction threshold for a particular application.

Codewords are generated by adding data symbols to the BPPM signal 212. For example, the BPPM signal 212 may have (K) data symbols of (s) bits each and (2t) symbol error correction capability. A Reed-Solomon encoder transforms the (K) message symbols to generate an (n) symbol codewords, where (n=K+2t). In an embodiment, the (n) symbol codeword can be corrected for up to (t) symbols that contain errors or incur errors during transmission, where each symbol has (s) bits. In such embodiments, each codeword symbol is converted into a PPM symbol. Each binary codeword set of bits is mapped to one time location. For example, binary pattern (1010) is converted to decimal number 10 which is position 10 out of 16 possible positions in time.

For example, in one embodiment, a three error correcting codeword may be generated using a non-radix-2 error correcting code, Galois Field (GF) value of GF ($11^1$) and a R-S value of R-S (10,4). Where 11' represents a size of a finite field, where 11 is a prime number and 1 is a positive integer such that 11 has 1 element of the finite field as root. In the R-S notation, the 10 represents a total number of symbols ('n') of the codeword and 4 represents a length ('k') of the data symbols corresponding to the original set of pulses (e.g., R-S(n,k). In this embodiment, the parity is equal to n−k or 10-4 and thus (2t) is equal to six. The decoder circuit can correct up to (t) symbols that contain errors in a codeword where (2t=n−k). Thus, the decoder circuit can correct up to three errors. Another advantage of using PPM modulated Reed-Solomon codewords is for fading mitigation. For example, the FSO channel can cause amplitude fading of PPM which can result in not detecting PPM pulses during codeword intervals. When that occurs then the receiver may miss detecting a PPM symbol during that decoding interval, however it may know the location of the codeword where it did not detect a PPM symbol. This codeword location can be designated as an erasure. This reduces the number of degrees of freedom for detection by one for each codeword PPM symbol. With RS codes, the error decoding capability becomes t=n−k. It is not known a-priori how many errors may be due to PPM pulse positions being incorrect (hard-errors) versus how many PPM symbols are not detected, so the decoders can be designed with some number of erasures and hard-errors specified.

In some embodiments, the one or more codewords may be generated such that they are sparse. For example, the three error correcting codeword having a Galois Field (GF) value of GF ($11^1$) may have a low sparse level per the channel usage interval. The sparseness may be determined by the size of the finite field and the number of roots, here 1/11. For example, BPPM circuit 210 can generate data symbols for a radix-2 GF ($2^m$) Reed-Solomon encoder, where m is the number of bits to construct a Reed-Solomon codewords, a BPPM signal 212 (g(kT)). In some embodiments, bits can be converted into symbols for a non-radix-2 GF($p^m$)Reed-Solomon code, where (p) is a prime number. For example, if (p) and (m) are chosen to provide a minimum degree of sparsity (e.g. 10%) when these symbols are converted into PPM pulses and if ($1/p^m$)<10%, this should yield enough sparseness of PPM symbols such that FRI or compressive methods can be used to recovery PPM symbols. Usually, Radix-2 GF ($2^m$) R-S codes are less complex to implement.

In some embodiments, encoding the BPPM signal can increase the capacity (i.e., quantization) of the BPPM signal. For example, using the three error correcting codeword, having the Galois Field (GF) value of GF ($11^1$) and the R-S value of R-S (10,4), the number of possible codewords may be increased such that the number of possible codewords corresponds to the GF factor (here p=11) and the number of data symbols (here k=4). Thus, the number of possible codewords and/or quantization levels may be increased such that the number of possible codewords is equal to $p^k$ (here $11^4$) messages per channel usage interval or $\log_2(11^4)$ bits≈12 bits per channel usage. In contrast to conventional M-PPM, which would provide 10*11=110 time slots per channel usage, which is <7-bits per channel usage.

It should be appreciated that for encoded messages, the number of codewords can be equal to the number of PPM pulses since there is only one PPM pulse per codeword symbol. For example, in an embodiment having 1 pulse per codeword, the probability of having adjacent PPM symbols close to each other in time can be avoided, thus minimizing optical pulse demodulator receiver issues.

At block 308, the coded signal (e.g., encoded BPPM signal) may be formed using the one or more codewords to represent the set of pulses. The coded signal may include R-S encoded BPPM pulses.

The coded signal may be provided to an optics device (e.g., first optics device 112 of FIG. 1) for transmission over the FSO channel. The FSO channel may be subject to fading and/or turbulence. The FSO channel may include, but not limited to, air, outer space, or a vacuum. The atmospheric conditions of the respective FSO channel can cause errors during transmission due to issues such as atmospheric absorption, turbulence and fading caused by rain, snow, fog, etc. In an embodiment, by combining encoding techniques as described herein with binomial PPM pulses, the effects of fading and/or turbulence of the FSO channel may be mitigated or eliminated. For example, the encoding may provide coding gain against fading and/or turbulence typically experienced in transmitting signals over the FSO channel. The sparseness of the BPPM signal can be exploited on the receiver end to allow for compressive sensing and thus, in some embodiments, decreasing receiver recovery reconstruction sampling rate as compared with conventional methods.

In some embodiments, the received coded signal can be filtered and sampled using FRI techniques in one or more stages to recover the set of pulses from the received coded signal (e.g., BPPM pulses, BPPM symbols). In some embodiments having a single stage recovery approach, direct FRI recovery may be performed to determine position data for the set of pulses. The position data for the set of pulses can correspond to position data for the one or more sparse codewords (e.g., R-S BPPM codewords) in the coded signal.

In a two-stage recovery approach, during a first stage, position and/or amplitude data for the set of pulses can be determined. A grid (or graph) can be generated plotting each of the pulses according to their respective position and amplitude data. The second stage may include performing at least one of the following: resampling to BPPM codeword positions or time-multiplexed BPPM direct symbol recovery.

Figure 3B:
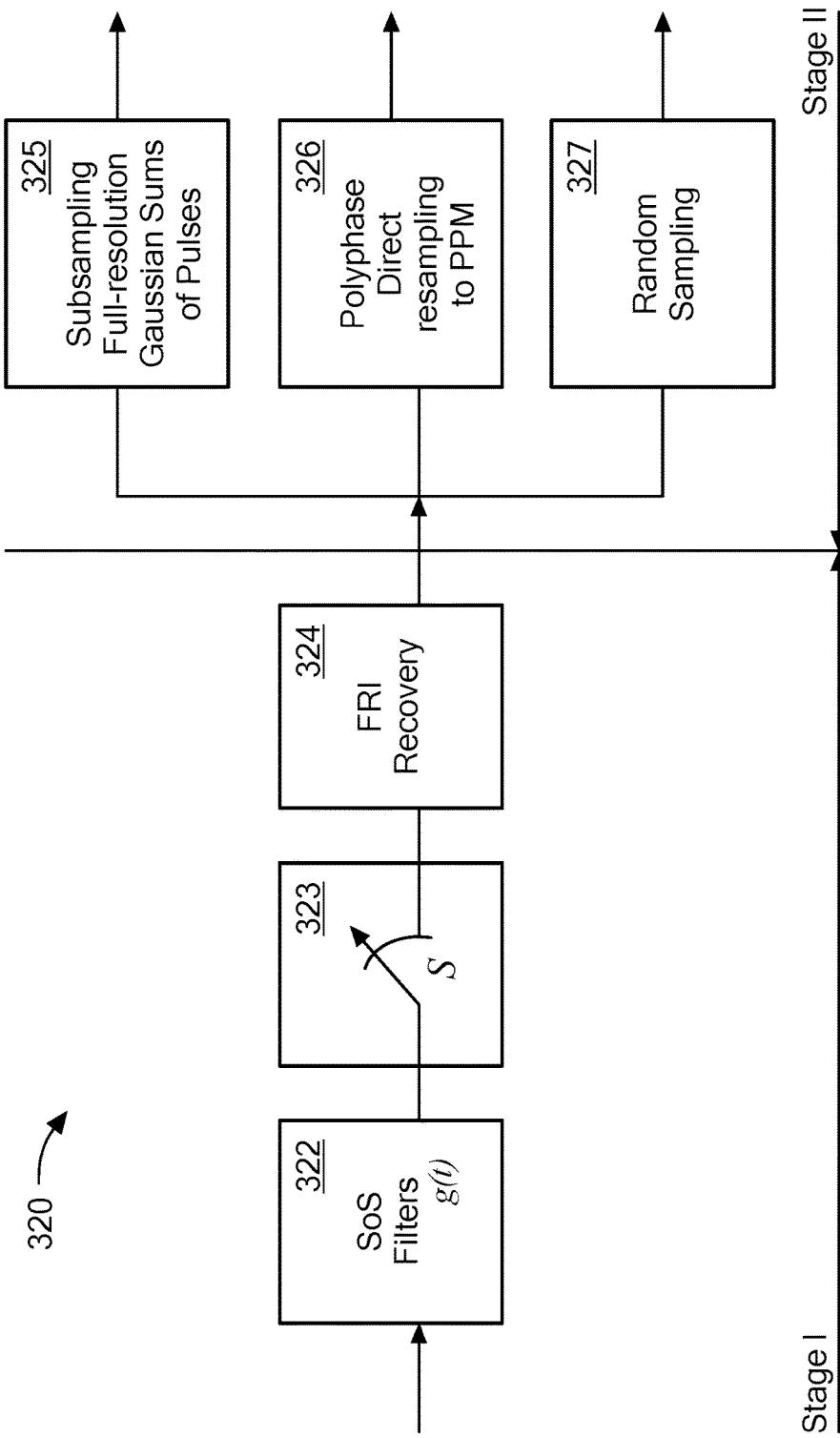
FIG. 3B is a block diagram of a two stage method for performing multi-stage reduced sampling.

In another two-stage embodiment and referring briefly to FIG. 3B, a method 320 for performing a multi-stage reduced sampling technique is provided. Method 320 includes a first stage and a second stage. In the first stage, at block 322, the received coded signal can be filtered to generate a filtered signal. A variety of different filtered techniques may be used to generate the filtered signal and will be discussed in greater detail below with respect to block 310 of FIG. 3A. At block 323, the filtered signal can be sampled to generate a set of samples. The sampling techniques will be discussed below with respect to block 312 of FIG. 3A. At block 324, FRI recovery may be performed on the set of samples to determine position and/or amplitude data for the set of pulses in the received coded signal.

The position and amplitude data for the set of samples may be provided to at least one of a plurality of different second stage techniques. For example, the second stage may include performing at least one of the following: direct-down-sampling at block 325, resampling to PPM codeword positions at block 326 or random sampling recovery using compressive sensing techniques at block 327. Each of the second stage approaches will be described in greater detail below with respect to FIGS. 3C-3E, respectively.

At block 310, a sampling kernel may be applied to a received coded signal (hereinafter coded signal) to generate a filtered signal. The coded signal may be received at an optics device of a receiver portion of an OAM transceiver system (e.g., second optics device 114 of receiver 122 of FIG. 1). The coded signal may be in the form of a non-bandlimited signal. For example, the coded signal may include, but not limited to, at least one of a stream of Diracs, non-uniform splines, or piecewise polynomials.

The coded signal can be sampled at its respective rate of innovation. For example, the coded signal may include a finite number of degrees of freedom per unit of time ('$\tau$') and this number may be referred to as a rate of innovation ('p') of the coded signal. The rate of innovation of the coded signal may be based at least upon the type of signal it is. For example, in one embodiment, a stream of Diracs may have a rate of innovation of $$p = \frac{2K}{\tau},$$

a non-uniform spline may have a rate of innovation of $$p = \frac{2K}{\tau},$$

and a piecewise polynomial may have a rate of innovation of $$p = \frac{(R+2)K}{\tau},$$

where K represents a number of Diracs corresponding to the respective signal and $\tau$ represents the period of unit of time. Thus, the stream of Diracs may have 2K degrees of freedom per unit of time ('$\tau$'), the non-uniform splines may 2K degrees of freedom per unit of time ('$\tau$') and the piecewise polynomial may (R+2)K degrees of freedom per unit of time ('$\tau$'). In an embodiment, the rate of innovation can be proportional to the number of Diracs.

To sample and ultimately reconstruct the coded signal at its respective rate of innovation, the sampling kernel may be applied to the coded signal. The sampling kernel may include sinc and/or Gaussian kernels. For example, the sampling kernel may include a lowpass filter approximation filter (e.g., sinc filter) and generated a filtered signal that includes a lowpass approximation of the coded signal. In some embodiments, the sampling kernel may be referred to as a convolution kernel or smoothing filter.

In some embodiments, the coded signal may be converted into a different form from the form it was received in at the optics device for sampling and reconstruction. For example, the coded signal having non-uniform splines or piecewise polynomials may be converted into a stream of K Diracs, where K represents the number of Diracs in the stream over the channel usage interval. To convert the coded signal, one or more derivatives of the coded signal may be performed until the stream of K Diracs is generated. The coded signal may be sampled and reconstructed using properties (e.g., position, amplitude, weights) of each of the K Diracs.

At block 312, the filtered signal can be sampled to generate a set of samples. In an embodiment, the filtered signal may be sampled such that a minimum number of samples are determined. The minimum number of samples may be a minimum number of samples needed to reconstruct the coded signal accurately within a set accuracy threshold.

In some embodiments, a minimum number of samples may be used for compressive sensing. The compressive sensing techniques, as described herein, can be performed to recover one or more signals using fewer samples and/or measurements than traditional methods. For example, the receiver portion of the OAM transceiver can be configured to perform compressive sensing on the filtered signal which may be a sparse representation of the original signal. The sparseness of the filtered signal can be exploited to accurately reconstruct the original signal using the minimum number of samples.

In some embodiments, the number of degrees of freedom of the respective filtered signal corresponds to the minimum number of samples needed to reconstruct the coded signal accurately within the set accuracy threshold. For example, in a signal having a stream of K Diracs, the number of degrees of freedom may be 2K. Thus, 2K samples may be the minimum number of samples needed to accurately reconstruct the signal.

In an embodiment, using the sampling kernel $h_B(t)=B\text{sinc}(Bt)$, where B is chosen such that it is greater than or equal to the rate of innovation $$p = \frac{2K}{\tau}.$$

The filtered signal can be convolved and sampled, $(h_B(t)*x(t))$ at N uniform locations ($t=nT$, $n=0, N-1$), where $N \geq 2M+1$, and $M=[B\tau/2]$. The samples of the filtered signal can be represented by the following:

$$y(n) = \langle h_B(t-nT), x(t) \rangle, n=0, \ldots, N-1$$

where $$y(n) = \int_{-\infty}^{\infty} h_B(nT-t) x(t) dt$$

In some embodiments, $y(n)$ may correspond to a sufficient characterization of $x(t)$, where $x(t)$ represents the coded signal transmitted over the FSO channel.

At block 314, position and amplitude data for each of the samples of the filtered signal can be determined. The position and amplitude data of the samples may correspond to one or more Fourier series coefficients of the coded signal (e.g., $x(t)$). Thus, the Fourier series coefficients may be determined in order to determine the position and amplitude data for each of the samples. The number of Fourier series coefficients needed to determine the position and amplitude data may correspond to the number of degrees of freedom of the respective signal.

For example, once a predetermined number of Fourier series coefficients of the coded signal ($x(t)$) are determined equal to the number of degrees of freedom of the respective signal, position and amplitude data for the coded signal can be determined.

A $\tau$-periodic stream of K Diracs can be represented by the following formula:

$$x(t) = \Sigma_{n \in \mathbb{Z}} c_n \delta(t-t_n)$$

Where $t_{n+K} = t_n + \tau$, and $c_{n+K} = c_n + \tau \forall_n \in \mathbb{Z}$. This signal has 2K degrees of freedom per period, and thus, has a rate of innovation of $$p = \frac{2K}{\tau}.$$

The periodic stream of Diracs can be rewritten as:

$$x(t) = \sum_{k=0}^{K-1} c_k \sum_{n \in \mathbb{Z}} \delta(t - t_k - n\tau)$$

$$x(t) = \sum_{k=0}^{K-1} c_k \frac{1}{\tau} \sum_{m \in \mathbb{Z}} e^{i\left(\frac{2\pi m(t-t_k)}{\tau}\right)}$$

By invoking Poisson's sum formula, we get:

$$x(t) = \sum_{m \in \mathbb{Z}} \frac{1}{\tau} \left( \sum_{k=0}^{K-1} c_k e^{-i\left(\frac{2\pi m(t-t_k)}{\tau}\right)} \right) e^{i\left(\frac{2\pi m t}{\tau}\right)}$$

$$x[m] = \frac{1}{\tau} \left( \sum_{k=0}^{K-1} c_k e^{-i\left(\frac{2\pi m t_k}{\tau}\right)} \right), m \in \mathbb{Z}$$

where $c_k$ is the amplitude of the Dirac impulse, $t_k$ is the time (i.e location of the impulse and $\tau$ is the time interval for one period of Dirac impulses. $X[m]$ represents the Fourier series coefficients (spectral values) of the coded signal, $x(t)$, as a linear combination of (K) complex exponentials. $X[m]$ can be used to determine the position and amplitude data for each of the samples. To determine position $t_k$ data a variety of methods may be used including, but not limited to, Prony's method, matrix pencil method, MuSIC methods, compressive sensing or an annihilating filter. To determine amplitude ($c_k$) data a variety of methods may be used including, but not limited to, Levinson-Durbin algorithms or an annihilating filter.

In some embodiments, an annihilating filter $A[m]$ can be used to solve for the Fourier series coefficients. The roots of the annihilating filter $A[m]$ correspond to the location ($t_k$) of each of the Diracs. Thus, by solving for the roots of the annihilating filter $A[m]$, the locations ($t_k$) of each of the Diracs are identified.

For example, a finite Fourier series $A[m]$, $m=0, \ldots, K$ with z-transform represented as:

$$A(z) = \sum_{k=0}^{K} A[m] z^{-m}$$

And having K zeroes at $$u_k = e^{-i\left(\frac{2\pi t_k}{\tau}\right)},$$

that is $$A(z) = \prod_{k=0}^{K} \left(1 - e^{-i\left(\frac{2\pi t_k}{\tau}\right)} z^{-1}\right)$$

Note that $A[m]$ is the convolution of K elementary filters with coefficients $$\left[1, -e^{-i\left(\frac{2\pi t_k}{\tau}\right)} z^{-1}\right],$$

$k=0, K-1$ and that the convolution of such a filter with the exponential $$\{-e^{-i\left(\frac{2\pi t_k}{\tau}\right)} z^{-1}\} m \in \mathbb{Z}$$

is zero. For example:

$$\left[1, -e^{-i\left(\frac{2\pi t_k}{\tau}\right)} z^{-1}\right] * \left[ \ldots, e^{i\left(\frac{2\pi t_k}{\tau}\right)}, 1, e^{-i\left(\frac{2\pi t_k}{\tau}\right)}, e^{-i\left(\frac{4\pi t_k}{\tau}\right)}\right] = 0$$

Thus, because x[m] is the sum of (K) exponentials and each being zeroed out by one of the roots of A[m], it follows that A[m]*x[m]=0. The filter A[m] is thus referred to as an annihilating since it annihilates (K) exponentials. In some embodiments, the annihilating filter may be referred to as the error locating filter. By obtaining the roots of the annihilating filter A [m], the positions, $t_k$, of the Diracs are identified. Having the positions, the amplitudes (or weights), $c_k$, of the Diracs can be determined.

Let $$x[m] = \frac{1}{\tau}\left(\sum_{k=0}^{K-1} c_k e^{-i\left(\frac{2\pi m t_k}{\tau}\right)}\right),$$

and with $$u_k = e^{-i\left(\frac{2\pi t_k}{\tau}\right)} \text{ then } x[m] = \frac{1}{\tau}x[m] = \frac{1}{\tau}\left(\sum_{k=0}^{K-1} c_k u_k^m\right)$$

then with $A(z)=\Pi_{k=0}^{K}(1-u_k z^{-1})=\Sigma_{l=0}^{K} A[l]z^{-l}$, it follows $$(A*x)[m] = \sum_{l=0}^{K} A[l]x[m-l]$$

$$(A*x)[m] = \sum_{l=0}^{K} A[l]x[m-l]$$

$$= \sum_{l=0}^{K}\sum_{k=0}^{K-1} c_k A[l] u_k^{n-l}$$

$$= \sum_{k=0}^{K-1} c_k \left(\sum_{l=0}^{K} A[l] u_k^{-l}\right) u_k^n = 0$$

since $A(u_k)=(\Sigma_{l=0}^{K} A[l] u_k^{-l})=0$, $$\cdot x[m] = \frac{1}{\tau}\left(\sum_{k=0}^{K-1} c_k e^{-i\left(\frac{2\pi m t}{\tau}\right)}\right)$$

the definition of annihilating filter

Since $$y[n] = \sum_m x[m] H_B\left(\frac{2\pi m}{\tau}\right) e^{i\left(\frac{2\pi mnT}{\tau}\right)},$$

and for $$H_B\left(\frac{2\pi m}{\tau}\right)$$

a sinc function thus a rectangular pulse in frequency domain, then $$y[n] = \sum_m x[m] e^{i\left(\frac{2\pi mnT}{\tau}\right)}$$

thus, the DFT can be used of y[n] to give x[m]. To get the coefficients of the annihilation filter one solves $\Sigma_{l=0}^{K} A[l]x[m-l]=0$, For example, K=3, one gets:

$$\begin{bmatrix} x[0] & x[-1] & x[-2] \\ x[1] & x[0] & x[-1] \\ x[2] & x[1] & x[0] \end{bmatrix} \cdot \begin{bmatrix} A[1] \\ A[2] \\ A[3] \end{bmatrix} = -\begin{bmatrix} X[1] \\ X[2] \\ X[3] \end{bmatrix}$$

which can be solved for A[1], A [2], A[3]. Now one solves for the roots of $A[z]=\Sigma_{m=0}^{K} A[m]z^{-m}=0$, where $A(z)=\Pi_{k=0}^{K}(1-u_k z^{-1})$, where $$u_k = e^{-i\left(\frac{2\pi t_k}{\tau}\right)}.$$

This gives locations of $t_k$. Since $$x[m] = \frac{1}{\tau}\left(\sum_{k=0}^{K-1} c_k e^{-i\left(\frac{2\pi m t_k}{\tau}\right)}\right),$$

then for K=3, $$\begin{bmatrix} X[1] \\ X[2] \\ X[3] \end{bmatrix} = \frac{1}{\tau}\begin{bmatrix} 1 & 1 & 1 \\ e^{-i(2\pi t_0/\tau)} & e^{-i(2\pi t_1/\tau)} & e^{-i(2\pi t_2/\tau)} \\ e^{-i(4\pi t_0/\tau)} & e^{-i(4\pi t_1/\tau)} & e^{-i(4\pi t_2/\tau)} \end{bmatrix} \cdot \begin{bmatrix} c_0 \\ c_1 \\ c_2 \end{bmatrix}$$

can be solved for $c_0$, $c_1$, $c_2$ using matrix inverse method.

In some embodiments, the amplitude data for each of the samples of the filtered signal can be determined using at least one of the following techniques; direct-down-sampling, resampling to PPM codeword positions or random sampling recovery using compressive sensing techniques. Determining the amplitude data for each of the BPPM pulses may correspond to a second stage of a multi-stage recovery technique.

For example and now referring to FIG. 3C, a method 330*a* for performing down sampling is provided. Method 320*a* begins at block 332, by generating a full resolution Sum of Gaussians using the position data for each of the samples. The output signal of the FRI position and amplitude recovery (e.g., first stage block 324 of FIG. 3B) can be represented as follows: $\{x_k, t_k\}$, k=(0, 1, . . . , L−1), where $x_k$ represents the signal amplitude, $t_k$ represents time and k represents is the time epoch.

The output signal of the FRI position and amplitude recovery can be downsampled to reduce its respective sampling rate. For example, a full resolution Sum of Gaussians may be generated using the position and amplitude data from the output signal of the FRI position and amplitude recovery. The full resolution Sum of Gaussians may be represented as follows:

$$y(nT) = \sum_{l=0}^{L-1} x_l \exp\left(-\frac{(nT-t_l)^2}{2\sigma^2}\right), n = [0, 1, \ldots, N-1]$$

where $x_l$, $t_l$ are amplitude and time epoch respectively. T is the sampling time interval for high resolution signal and σ is the standard deviation of the Gaussian pulses—assumed to be equal for all pulses. N is the total number of samples at full time resolution.

At block 334, the full resolution signal can be decimated to reduce a sampling rate by a factor of $$\frac{Q}{N},$$

where Q represents the signal upsampling factor and N represents signal downsampling factor. The decimation may provide Q samples of the output signal. The Q samples can be represented as follows:

$$z(rW) = y(rW)$$

$$W = \left[\frac{N}{Q}T\right], r = [0, 1, \ldots, Q-1]$$

At block 336, using the Q samples, the amplitudes for each of the Q samples can be determined as follows.

$$PPM(rW) = y(rW), r = [0, 1, \ldots Q-1];$$

where y(rW) is the output of the downsampled full resolution sum of Gaussians signal representation.

In some embodiments, the down sampling techniques may be performed without decimating the full resolution signal. For example, a down sampling method 330b begins at block 338, by generating a Sum of Gaussians. The Sum of Gaussians can be generated at Q positions $$\left(\text{e.g., } W = \left[\frac{N}{Q}T\right]\right)$$

for the output signal of the FRI position and amplitude recovery can be represented as follows: $\{x_k, t_k\}$, k=(0, 1, . . . , L-1). The Sum of Gaussians can provide Q samples of the output signal, represented as follows:

$$y(rW) = \sum_{l=0}^{L-1} x_l \exp\left(-\frac{(rW-t_l)^2}{2\sigma^2}\right), r = [0, 1, \ldots, Q-1]$$

At block 339, amplitude data for each of the Q samples can be determined. For example, amplitude data can be determined as follows:

$$PPM(rW) = y(rW), r = [0, 1, \ldots, Q-1];$$

Figure 3D:
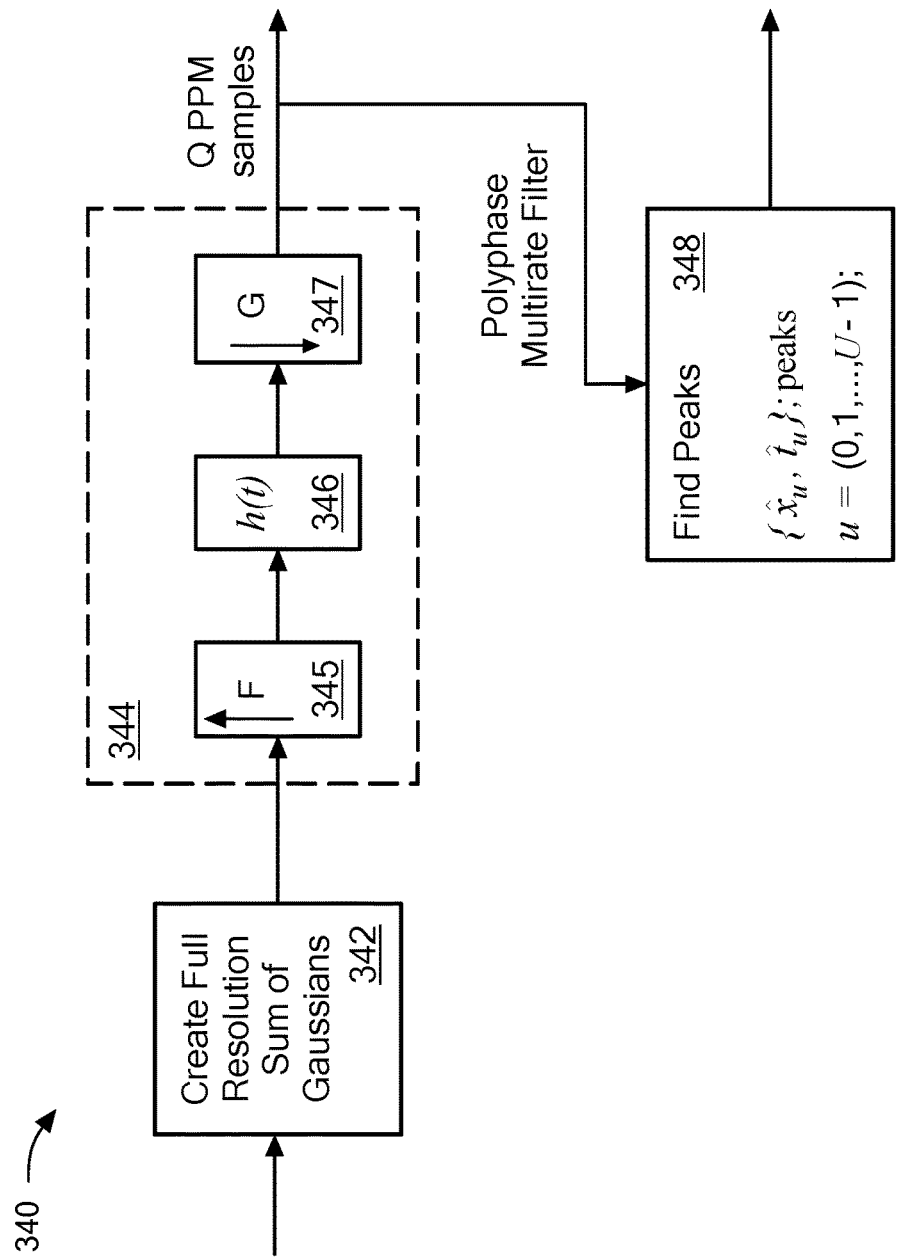
FIG. 3D is a block diagram of a method for performing multi-rate filter resampling.

Now referring to FIG. 3D, a method 340 is provided for performing resampling using multi-rate filter resampling techniques. Method 340 using multi-rate filter resampling techniques may be performed on the output signal of the FRI position and amplitude recovery (e.g., $\{x_k, t_k\}$, k=(0, 1, . . . , L-1). For example, at block 342, a full resolution Sum of Gaussians may be generated.

$$y(nT) = \sum_{l=0}^{L-1} x_l \exp\left(-\frac{(nT-t_l)^2}{2\sigma^2}\right), n = [0, 1, \ldots, N-1]$$

At block 344, the full resolution Sum of Gaussians may be provided to a polyphase mulitrate filter. At block 345, the signal is upsampled by inserting Q zeros between each sample. At block 346, a low-pass filter is applied to the signal. At block 347, the output of the low pass filter is then downsampled by factor N to give Q samples. Thus, a multirate filter can generate Q samples of the original sum of Gaussians signal for representation of output signal at desired rate of PPM symbols.

The Q samples, which are the output of the multirate filter, can be represented as follows:

$$z(rW) = y(rW)$$

$$W = \left[\frac{N}{Q}T\right], r = [0, 1, \ldots, Q-1]$$

At block 348, amplitude data for each of the Q samples can be determined. For example, the amplitude data can be represented as follows:

$$PPM(rW) = y(rW), r = [0, 1, \ldots, Q-1];$$

Figure 3E:
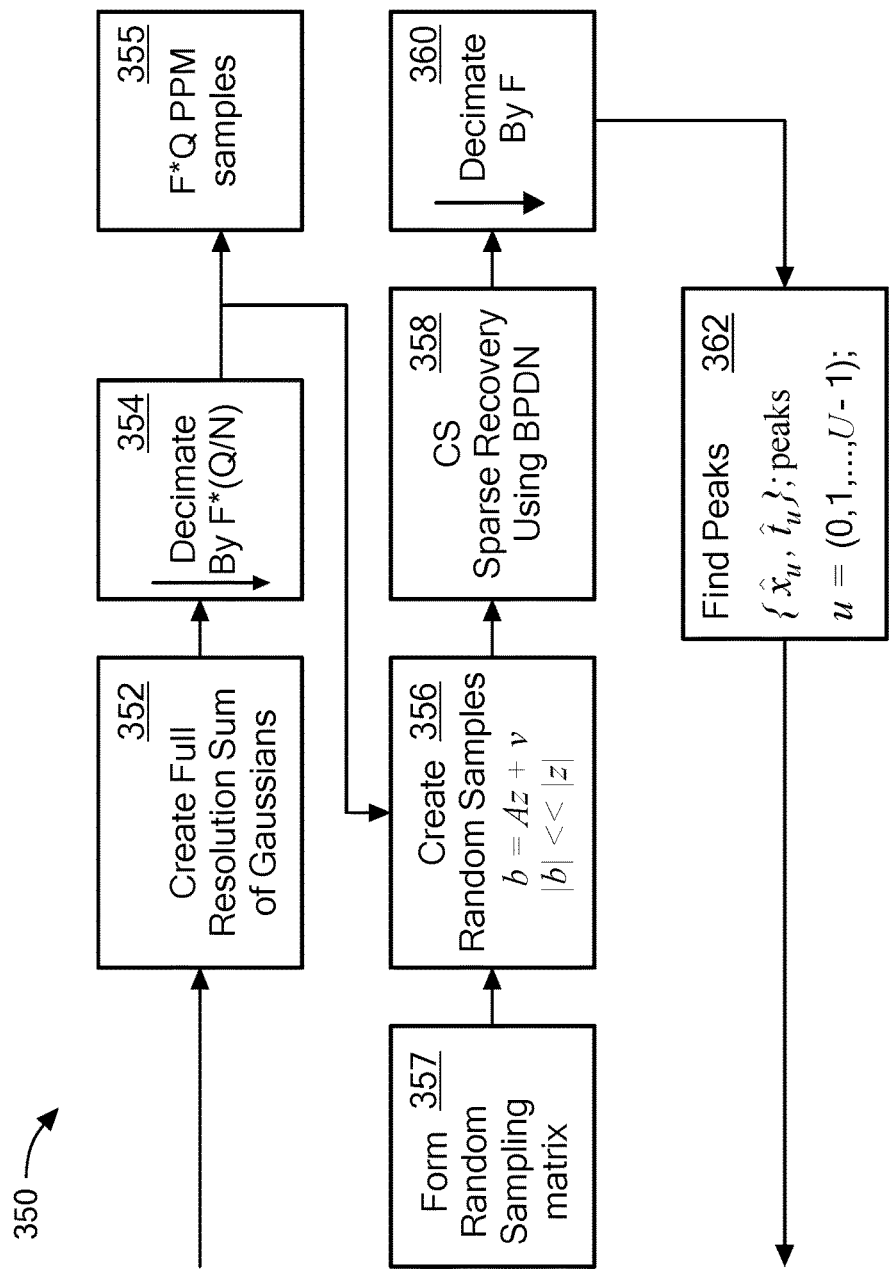
FIG. 3E is a block diagram of a method for performing random sampling.

Now referring to FIG. 3E, a method 350 is provided for performing random sampling. In some embodiments, random sampling recovery using compressive sensing techniques may be performed on the output signal of the FRI position and amplitude recovery (e.g., $\{x_k, t_k\}$, k=(0, 1, . . . , L-1). For example, at block 352, a full resolution Sum of Gaussians may be generated.

$$y(nT) = \sum_{l=0}^{L-1} x_l \exp\left(-\frac{(nT-t_l)^2}{2\sigma^2}\right), n = [0, 1, \ldots, N-1]$$

At block 354, the full resolution can be decimated to increase desired sampling rate PPM symbols by a factor of F $$\frac{Q}{N},$$

where F represents an upsampling factor for BPPM symbols, Q represents the upsampling rate and N represents the downsampling rate. At block 355, the decimation may provide F*Q samples of the output signal. The F*Q samples can be represented as follows for any of the resampling methods mention previously. The BPPM symbols are now oversampled relative to desired output sampling rate $$z(rW) = y(rW)$$

$$W = \left[\frac{N}{FQ}T\right], r = [0, 1, \ldots, FQ-1]$$

At block 356, a set of random samples can be generated from the F*Q samples, such that b=Az+v, where |b|<<|z|. At block 357, a random sampling matrix (e.g., A(r, s), r<<s, s≤FQ) can be applied to the F*Q samples to generate the set of random samples. In an embodiment, the set of random samples may include a sparse set of samples corresponding to the F*Q samples. Thus, compressive sensing techniques may be performed on the set of random samples. For example, at block 358, compressive sensing techniques may include sparse recovery using basis pursuit denoising (BPDN). The compressive sensing may provide an output represented as follows: $\hat{z}(rW)$, where, r=(0, 1, . . . , FQ-1). At block 360, the output of the compressive sensing may be decimated by a factor of F (e.g., $\hat{z}(rW)$, where, r=(0, 1, . . . , FQ-1) to generate Q samples.

At block 362, amplitude data for each of the Q samples can be determined. For example, the amplitude data can be represented as follows:

$$\{\hat{x}_u, \hat{t}_u\}, u = (0, 1, \ldots, Q-1)$$

$$PPM(rW) = \sum_{u=0}^{U-1} \hat{x}_u \delta((rW - \hat{t}_u)),$$

$$W = \left[\frac{N}{Q}T\right], r = [0, 1, \ldots, Q-1];$$

Referring back to FIG. 3A, at block 316, the coded signal can be reconstructed using the position and amplitude data for each of the samples. In an embodiment, the position data corresponds to a location along an x-axis of at least one Dirac of a sample and the amplitude data corresponds to a height along a y-axis of at least one Dirac of a sample. Thus, each of the Diracs and samples can be plotted on a graph having a unit of time representing the x-axis and an amplitude representing the y-axis. Graphing the K Diracs provides a reconstruction of the coded signal over one period. In an embodiment, the minimum number of samples corresponding to the degrees of freedom of the coded signal may be used to reconstruct the coded signal over one period.

At block 318, the reconstructed coded signal can be decoded to recover the original signal having the set of pulses. A decoder circuit (e.g., decoder circuit 260 of FIG. 2) can be used to decode the reconstructed signal by identifying and removing the error correction bits added to the original BPPM signal at step 3002 of method 300. In an embodiment, the decoding rate corresponds to the number of BPPM symbols per channel usage interval of the respective signal to be decoded.

A variety of different decoding techniques may be used to decode the reconstructed coded signal. For example, the reconstructed coded signal may be decoded using, but not limited to, at least one of Reed-Solomon, Peterson-Gorenstein-Zierler (PGZ) techniques, Forney techniques or Berlekamp-Massey techniques.

In some embodiments, the set of pulses may have been mapped to R-S codewords. The decoder circuit can to use the mapping to identify the set of pulses in the coded signal. The decoder circuit can remove the error correction bits from the coded signal to produce the original signal having the set of pulses (e.g., signal generated at step 304 of method 300). In some embodiments, the set of pulses can be converted back into the original data symbol to recover the original set of one or more bits.

In some embodiments, soft PPM symbol block decoding may be performed to decode the reconstructed coded signal. Soft PPM symbol block decoding may include one of or a combination of joint PPM sample sparse recovery techniques, dynamic programming block decoding techniques and R-S decoding techniques. In some embodiments, symbol-by-symbol sparse recovery for sparse signal recovery may include thresholding and/or peak finding of the corresponding sparse vector to determine peaks. Block decoding of each of the symbols in a PPM sequence over each R-S codeword can avoid the thresholding and/or peak finding for each symbol by using a dynamic programming algorithm (DPA). In some embodiment, a signal to noise ratio (SNR) gain can be achieved by coherently integrating over the symbol-by-symbol soft-decisions made using sparse recovery.

Figure 3F:
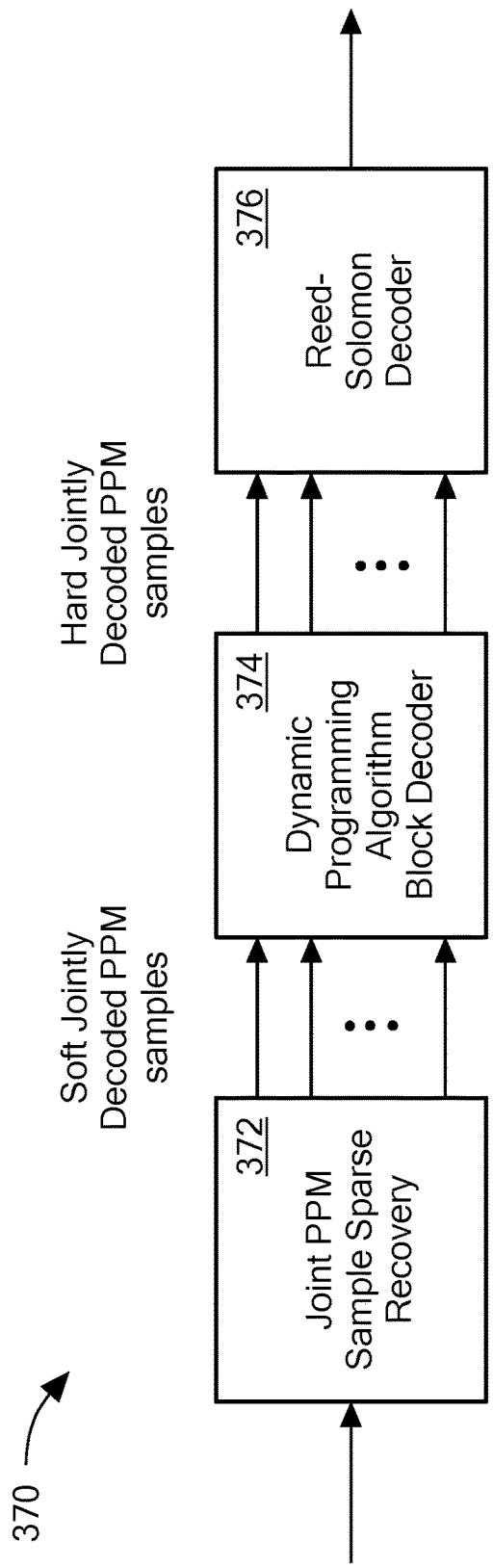
FIG. 3F is a block diagram of a method for performing soft PPM symbol block decoding.

For example and now referring to FIG. 3F, a method 370 for performing soft PPM symbol block decoding is provided. Method 370 begins at block 372 by performing joint PPM sample sparse recovery on the samples from the FRI recovery and compressive sensing techniques discussed above. The joint PPM sample sparse recovery may include at least one of the following: L-1 norm, basis pursuit denoising (BPDN) techniques, radar imaging (Potter)—relaxation techniques (p<1 or p>1) or matching pursuit (MP) techniques.

The output of the joint PPM sample sparse recovery may generate soft jointly decoded PPM samples (or BPPM samples). At block 374, dynamic programming block decoding may be performed on the soft jointly decoded PPM samples to generate hard jointly decoded PPM samples (or BPPM samples).

At block 376, R-S decoding techniques may be performed on the hard jointly decoded PPM samples to decode each of the PPM samples (or BPPM samples). For example, for a R-S, GF(16), each PPM codeword sample has 16 positions. Each of the sparse vector symbols can take a position in a trellis at each time epoch.

Referring back to FIG. 3A, a trellis as used herein refers to a connected graph with nodes and edges. Each set of nodes at a particular time (k) are possible states of the system. For example, each state can be a time position and measurement associated with that time position. Each edge can represent a transition of a state at time (k) to another possible state at time (k+1). Each node at a particular state may have a cost associated with it. In some embodiments, there is a cost associated with a transition between states. A path through the trellis is a sequence of edges through the trellis from the initial state to a final state, for example, (N). Each path through the trellis has a cumulative cost and minimizing that cost defines an "optimal" sequence of codeword symbols through the trellis. Each recovered sparse vector symbol can have 16 positions for GF(16) R-S codewords, which may include noise positions along with at least one signal of interest.

Thus, the sequence of symbols can form a path through the trellis from a first position to the next position for each path (i.e., length (N) of the respective codeword). In an embodiment, each trellis node can be fully connected to each successive nodes in the trellis. The DPA uses forward and/backward processing to determine an optimal path through the trellis.

In some embodiments, to verify an accuracy of the optimal path, an erasure symbol detection can be performed by analyzing an entropy of each PPM normalized codeword symbol (e.g., $H(x) = -\Sigma_{i=1}^{X} p(x_i) \log_2 p(x_i)$), where $p(x_i)$ is the probability of a state in the trellis at some time (k). A codeword can be associated with each set of states at time (k). $\log_2 p(x_i)$ is the (logarithm-base 2). In an embodiment, a large entropy may imply that the PPM symbol codeword has a large uncertainty with respect to the actual PPM position. Alternatively, a small entropy may imply that the PPM codeword symbol has a single spike (i.e., only one PPM position is in the codeword symbol).

Forward processing may include a measurement for each set of nodes at each time is the sparse vector reconstructed using sparse recovery. Thus, a metric can be computed at each node which can correspond to a best match of the measurement to (+1) since this the single possibility for a sparse symbol for a signal present. Otherwise, each symbol vector can be zero.

For each trellis node (i) at time $t_k$, the cost metric $d_i(t_k)$ can be computed using the following equation:

$$d_i(t_k) = \frac{1}{\sqrt{2\pi}\sigma} \max\left[\exp\left(\frac{1}{2\sigma^2}(\|z_i(t_k) - 1\|^2)\right)\right],$$

$$\approx \frac{1}{\sqrt{2\pi}\sigma} \exp\left[\min\left(\frac{1}{2\sigma^2}\{\|z_i(t_k) - 1\|^2\}\right)\right]$$

where $z_i(t_k)$ is the soft decoded value at a PPM position in the PPM symbol. In general, for multiple hypotheses for possible symbol values, "max" (i.e. maximum) computes the maximum for the set of hypotheses. σ is the standard deviation for a Gaussian random viable. In an embodiment, the above equation may represent a turbo-code approximation using "min" (i.e. minimum). For example, in some embodiments, there may be only one hypothesis. If the measured signal at a position that is close to (+1), then the cost is small. When the measured position is close to "zero", then the cost is higher.

A node can be identified as a set with two parameters, $N_i(t_k)=\{d_i(t_k), M_i\}$, where $M_i$ is (+1), assuming each PPM symbol can be transmitted as a pulse of amplitude (+1).

Thus, for a next or subsequent time epoch, a cumulative score can be computed for each node at time based on each of the previous nodes. A cumulative path to each current node can be determined, for example, to keep track of a possible optimal path to the current node. The cumulative path cost $C_i(t_k)$ can be defined as follows:

$C_i(t_k)=\max_j[C_j(t_{k-1})+d_i(t_k)]$, j=1, . . . ,16, for each
i=1, . . . ,16, and $C_j(t_{-1})=0$ for a GF(16) R-S code In an embodiment, the cumulative path can be defined to the current node with $N_i(t_{k-1})$, where $N_j(T_{k-1})$ corresponds to a node (J) that provides a max score. Furthermore, the cost at each node at time (k) is the cost of the node from the previous time computed by:

$P_i(t_k)=\text{EDGE}(N_i(t_{k-1}),N_j(t_k)) \cup P_j(t_{k-1})$ where (J) is the node from the previous time (k−1), that has the smallest cost $C_j(t_{k-1})$. "U" is the union operator from algebra.

where $P_i(t_1)=\lambda$, corresponding to a null' edge at the first time epoch. In some embodiments, the $N_{j,i}(t_{k-1})$ can be expurgated from the trellis such that the search for a second path does not include the node that is already part of the first path or another path. At each time epoch, each soft measurement can be used to update the cumulative scores and the cumulative paths. At the last time epoch, the cumulative scores and the cumulative path can be defined for the last set of nodes.

Backward processing is used determine a separate path through the trellis. For example, the cumulative scores at the last symbols can be ranked in descending order. The maximum score can define the end nodes for the optimal path. Then a backward trace can be generated to define the optimal paths determined using forward processing. The hypothesis associated with each path node to get to the final node can be represented as follows:

$[C_{m1,i}(t_N)>C_{m2,i}(t_N)> \ldots ]=\text{sort}[C_{i,j}(t_N)]$, for each
i=1, . . . ,16 where N represents the last time epoch and $G_{m1,i}(t_N)$ represents top cumulative scores. In an embodiment, the nodes corresponding to the top cumulative scores can be used for backtracking to define the optimal paths through the trellis. For example, a sequence of (+1) along each optimal path backward path can define the optimal sequence of symbols. In some embodiments, thresholding is not needed the last set of nodes in the trellis to determine at least the top two paths.

Erasure detection can be performed along an identified optimal path to verify the accuracy of the optimal path. For example, after determine at least one optimal path (e.g., path-1) for one or more top cumulative scores form forward processing, for any set of trellis nodes at each time epoch, an entropy calculation can be performed to determine if PPM symbols is an erasure. The erasure detection can be represented as follows:

$$H(X(t_k)) = -\sum_{i=1}^{16} p(x_i(t_k))\log(p(x_i(t_k)))$$

$$H(X(t_k)) > T, X(t_k) = \delta, \text{ else } X(t_k) = +1$$

where $X(t_k)$ represents the decoded PPM symbol random value, T represents a designated threshold and δ represents an erasure symbol value.

Figure 4:
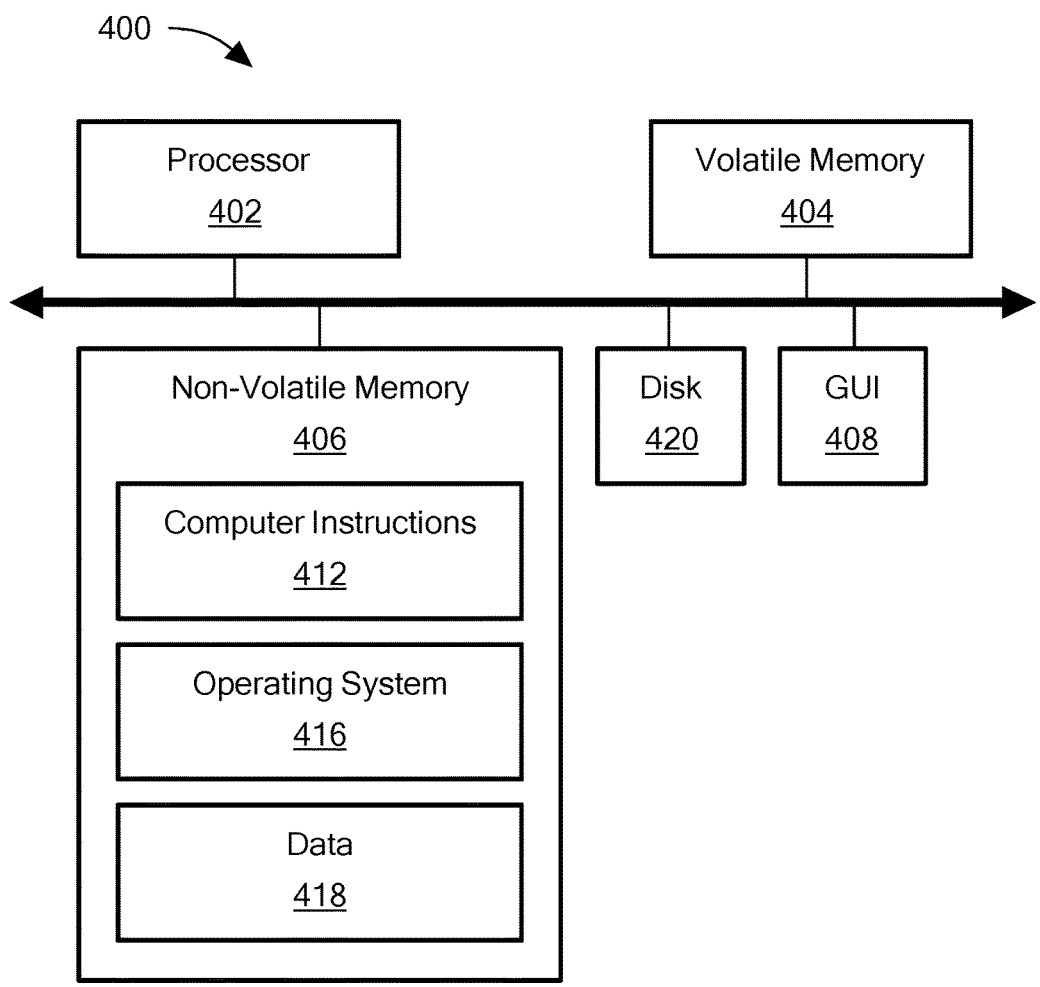
FIG. 4 is a block diagram of an embodiment of a processing system for generating and reconstructing a coded signal in accordance with the techniques described herein.

Referring now to FIG. 4, a computer 400 includes a processor 402, a volatile memory 404, a non-volatile memory 406 (e.g., hard disk), a graphical user interface (GUI) 408 (e.g., a mouse, a keyboard, a display, for example) and a computer disk 420. The non-volatile memory 406 stores computer instructions 412, an operating system 416 and data 418. In an embodiment, the data 418 may include data collected corresponding to signals transmitted and/or received by an OAM transceiver system. The data may include binomial pulse position modulation information and encoding information. For example, in some embodiments, the data may include encoding techniques used to encode the BPPM pulses, the data symbols used to modulate the set of one or more bits, and/or properties of a free-space channel the signal was transmitted over. In embodiment, the data may degrees of freedom, rate of innovation, and/or a number of Diracs corresponding to the signal.

In some embodiments, non-volatile memory 406 may include one or more look-up tables for storing and organizing captured data corresponding to signals transmitted and/or received by an OAM transceiver system, as well as any tables or matrices generated using the samples of the captured data. In one example, the computer instructions 412 are executed by the processor 402 out of volatile memory 404 to perform all or part of the method (or process) 300 of FIGS. 3-3A, method 320 of FIG. 3B, methods 330a, 330b (or process) of FIG. 3C, method 340 (or process) of FIG. 3D, method 350 (or process) of FIG. 3E and/or method 370 (or process) of FIG. 3F.

In an embodiment, computer 400 may be the same as or substantially similar to each of the components of OAM transceiver system 100 of FIG. 1, such as modulators 106a-106n and demodulators 120a-120n. Computer 400 may be the same as or substantially similar to each of the components of OAM transceiver system 200 of FIG. 2, such as BPPM circuit 210, encoding circuit 220, filtering circuit 240, reconstruction circuit 250, compressive sensing circuit 255 and decoding circuit 260. Computer 400 may perform all of the same functions and be configured to receive and generate the same data as each of modulators 106a-106n and demodulators 120a-120n of FIG. 1, BPPM circuit 210, encoding circuit 220, filtering circuit 240, reconstruction circuit 250, compressive sensing circuit 255 and decoding circuit 260 of FIG. 2. For example, computer 400 may be configured to generate, transmit, receive, sample, reconstruct and decode coded BPPM signals for FSO communications.

Methods 300, 320, 330a, 330b, 340, 350 and 370 are not limited to use with the hardware and software of FIG. 4; they may find applicability in any computing or processing environment and with any type of machine or set of machines that is capable of running a computer program. Methods 300, 320, 330a, 330b, 340, 350 and 370 may be implemented in hardware, software, or a combination of the two. Methods 300, 320, 330a, 330b, 340, 350 and 370 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform methods 300, 320, 330a, 330b, 340, 350 and 370 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. Alternatively, the system may be implemented, at least in part, as firmware.

A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform methods 300, 320, 330a, 330b, 340, 350 and 370. Methods 300, 320, 330a, 330b, 340, 350 and 370 may also be implemented as a machine-readable storage medium, configured with a computer program, where upon execution, instructions in the computer program cause the computer to operate in accordance with methods 300, 320, 330a, 330b, 340, 350 and 370.

Methods 300, 320, 330a, 330b, 340, 350 and 370 may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

A number of embodiments of the disclosure have been described. Nevertheless, it will be understood that various modifications may be made without departing from the spirit and scope of the disclosure. Elements of different embodiments described herein may be combined to form other embodiments not specifically set forth above. Other embodiments not specifically described herein are also within the scope of the following claims.

What is claimed:

1. A method for generating a coded signal, the method comprising:
    converting one or more bits of information into a data symbol for transmission over a free-space optical channel;
    modulating the data symbol into a set of pulses;
    generating a signal having a plurality of pulse positions, wherein:
        each pulse of the set of pulses is positioned in a single pulse position of the plurality of pulse positions,
        the set of pulses occupy less than 50% of a total number of the plurality of pulse positions, and
        each pulse position is randomly selected or based on a position of another different pulse in the set of pulses;
    generating one or more codewords based on a number of error correction bits and the signal having the set of pulses; and
    forming a coded signal using the one or more codewords to represent the signal having the set of pulses for transmission over the free-space optical channel.

2. The method of claim 1, further comprising determining the number of error correction bits based on a number of data bits in the signal and an error correction threshold.

3. The method of claim 1, further comprising applying a sampling kernel to the coded signal to generate a filtered signal and sampling the filtered signal to generate samples of the filtered signal.

4. The method of claim 3, further comprising determining position data and amplitude data for each of the samples of the filtered signal.

5. The method of claim 4, further comprising reconstructing the coded signal using the position and amplitude data for each of the samples.

6. The method of claim 1, further comprising decoding the coded signal at a sample rate equal to a number of pulses per predetermined time interval of the coded signal.

7. A method for reconstructing a signal, the method comprising:
    applying a sampling kernel to a coded signal received from a free-space optical channel to generate a filtered signal;
    sampling the filtered signal to generate samples of the filtered signal over a predetermined time interval;
    determining position and amplitude data for each of the samples of the filtered signal over the predetermined time interval;
    reconstructing the coded signal using the position and amplitude data for each of the samples; and
    decoding the reconstructed coded signal to generate a signal having a plurality of pulse positions, wherein:
        each pulse of the set of pulses is positioned in a single pulse position of the plurality of pulse positions,
        the set of pulses occupy less than 50% of a total number of the plurality of pulse positions, and each pulse position is randomly selected or based on a position of another different pulse in the set of pulses.

8. The method of claim 7, wherein the sampling kernel has a bandwidth corresponding to a rate of innovation of the coded signal.

9. The method of claim 7, further comprising generating a set of Diracs based on one or more derivatives of an equation representing the samples of the coded signal.

10. The method of claim 9, further comprising determining the position data and the amplitude data for each Dirac in the set of Diracs.

11. The method of claim 10, further comprising reconstructing the coded signal using the position data and the amplitude data for each Dirac corresponding to the samples in the predetermined time interval.

12. The method of claim 7, further comprising decoding the coded signal at a sampling rate equal to a number of pulses per channel usage interval of the coded signal.

13. A system for generating and reconstructing a coded signal, the system comprising:
 a pulse position modulation circuit configured to convert a data symbol into a set of pulses, the data symbol corresponding to one or more bits, and generate a signal having a plurality of pulse positions, wherein:
  each pulse of the set of pulses is positioned in a single pulse position of the plurality of pulse positions,
  the set of pulses occupy less than 50% of a total number of the plurality of pulse positions, and
  each pulse position is randomly selected or based on a position of another different pulse in the set of pulses;
 an encoding circuit configured to encode the signal by generating one or more codewords based on a predetermined number of error correction bits, wherein the one or more codewords to represent the signal having the set of pulses;
 a filtering circuit configured to receive the coded signal, apply a sampling kernel to the received coded signal to generate a filtered signal, and sample the filtered signal to generate a set of samples of the filtered signal over a predetermined time interval; and
 a decoding circuit configured to decode the samples of the filtered signal to recover the signal having the set of pulses over the channel usage interval.

14. The system of claim 13, further comprising a reconstruction module configured to determine position and amplitude data for each of the samples of the filtered signal.

15. The system of claim 14, wherein the reconstruction module is configured to reconstruct the coded signal using the position and amplitude data for each of the samples.

16. The system of claim 13, wherein the decoder circuit is configured to sample the coded signal at a rate equal to a number of pulses per the channel usage interval of the coded signal.

* * * * *